United States Patent
Marocchini et al.

(10) Patent No.: US 11,448,139 B2
(45) Date of Patent: Sep. 20, 2022

(54) FUELDRAULIC AIR VALVE

(71) Applicant: Hamilton Sundstrand Corporation, Charlotte, NC (US)

(72) Inventors: Francis P. Marocchini, Somers, CT (US); Aaron F. Rickis, Longmeadow, MA (US); August M. Coretto, Manchester, CT (US); Scott W. Simpson, Easthampton, MA (US); Gary R. Marconi, New Hartford, CT (US); Glenn Gradischer, Canton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 434 days.

(21) Appl. No.: 16/421,959

(22) Filed: May 24, 2019

(65) Prior Publication Data
US 2020/0370480 A1 Nov. 26, 2020

(51) Int. Cl.
| | |
|---|---|
| *F02C 9/18* | (2006.01) |
| *F16K 1/12* | (2006.01) |
| *F16K 49/00* | (2006.01) |
| *F02C 3/04* | (2006.01) |
| *F02C 7/18* | (2006.01) |
| *F02C 9/20* | (2006.01) |

(52) U.S. Cl.
CPC ............ *F02C 9/18* (2013.01); *F02C 3/04* (2013.01); *F02C 7/18* (2013.01); *F02C 9/20* (2013.01); *F16K 1/126* (2013.01); *F16K 49/00* (2013.01); *F05D 2220/32* (2013.01)

(58) Field of Classification Search
CPC .... F16K 1/126; F16K 31/122; F16K 31/1221; F16K 31/1223; F02C 6/08; F02C 9/18; F05D 2270/64; F02K 1/763
See application file for complete search history.

(56) References Cited

U.S. PATENT DOCUMENTS

| | | | |
|---|---|---|---|
| 5,048,286 A * | 9/1991 | Stransky | F02C 9/18 60/226.3 |
| 5,988,589 A * | 11/1999 | Mowill | F01D 17/145 251/305 |
| 6,622,472 B2 * | 9/2003 | Plumpe, Jr. | F02K 1/002 239/265.19 |
| 6,783,108 B2 | 8/2004 | Jansen | |
| 7,540,144 B2 | 6/2009 | Makuszewski | |
| 2002/0005217 A1 * | 1/2002 | Lyons | G05D 7/014 137/220 |
| 2007/0089429 A1 * | 4/2007 | Makuszewski | F02K 3/075 60/785 |
| 2007/0102049 A1 | 5/2007 | Labenz | |

(Continued)

OTHER PUBLICATIONS

Extended EP Search Report for EP Application No. 19209737.6 dated Jun. 22, 2020.

*Primary Examiner* — Andrew H Nguyen
(74) *Attorney, Agent, or Firm* — Carlson, Gaskey & Olds, P.C.

(57) ABSTRACT

A valve assembly for a turbine engine includes a valve arranged in an air flow path.
The valve has a shaft. The valve is movable between an open position and a closed position. A hydraulic actuator is coupled to the shaft. The hydraulic actuator is configured to utilize fuel as a working fluid. The hydraulic actuator is configured to move the valve between the open position and the closed position.

17 Claims, 3 Drawing Sheets

(56) References Cited

U.S. PATENT DOCUMENTS

| | | | |
|---|---|---|---|
| 2012/0045317 A1* | 2/2012 | Saladino | F02C 6/08 |
| | | | 415/145 |
| 2012/0167589 A1 | 7/2012 | Fritsch | |
| 2016/0208694 A1* | 7/2016 | Simpson | F04B 53/10 |
| 2017/0175751 A1* | 6/2017 | Moniz | F01D 25/12 |
| 2017/0335775 A1* | 11/2017 | Ribarov | F02C 6/08 |
| 2017/0356469 A1* | 12/2017 | Yates | F02C 7/2365 |

* cited by examiner

FUELDRAULIC AIR VALVE

BACKGROUND

This disclosure relates to an air valve system and more particularly a fueldraulic air valve system.

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections. The compressor section and turbine section each have multiple stages of blades that rotate about a central axis and multiple stages of vanes that are stationary relative to the central axis.

Some gas turbine engines have air valves for bleed air. Bleed air may be used in the engine such as for starting, low power stability, and stall recovery, for example.

SUMMARY

In one exemplary embodiment, a valve assembly for a turbine engine includes a valve arranged in an air flow path. The valve has a shaft. The valve is movable between an open position and a closed position. A hydraulic actuator is coupled to the shaft. The hydraulic actuator is configured to utilize fuel as a working fluid. The hydraulic actuator is configured to move the valve between the open position and the closed position.

In a further embodiment of any of the above, the valve is a poppet valve.

In a further embodiment of any of the above, the air flow path is configured to have a temperature of greater than about 1000° F. (537.8° C.).

In a further embodiment of any of the above, the hydraulic actuator is configured to move the valve to an infinite number of positions between the open position and the closed position.

In a further embodiment of any of the above, the valve is formed from metallic components.

In a further embodiment of any of the above, a thermal barrier is arranged between the valve and the hydraulic actuator.

In a further embodiment of any of the above, cooling fins are arranged on the shaft.

In a further embodiment of any of the above, a linear variable displacement transformer is arranged on the shaft.

In a further embodiment of any of the above, the shaft comprises a first shaft portion that is attached to the valve and a second shaft portion attached to the actuator. A thermal barrier is arranged between the first and second shaft portions.

In a further embodiment of any of the above, an actuator housing defines a cavity about the shaft. A cooling port extends through the housing to permit ambient air to flow into the cavity.

In a further embodiment of any of the above, a second cavity is defined within the shaft. A second cooling port extends through the shaft to permit ambient air to flow into the second cavity.

In a further embodiment of any of the above, a plurality of seals are arranged between the hydraulic actuator and the valve.

In a further embodiment of any of the above, the actuator housing includes a port configured to communicate fuel around the plurality of seals.

In another exemplary embodiment, a turbine engine includes a compressor configured to deliver air to a combustor. A valve assembly has a valve arranged in an air flow path. The valve has a shaft. The valve is movable between an open position and a closed position. A hydraulic actuator is coupled to the shaft. The hydraulic actuator is configured to utilize fuel as a working fluid. The hydraulic actuator is configured to move the valve between the open position and the closed position.

In a further embodiment of any of the above, the air flow path receives bleed air from the compressor.

In a further embodiment of any of the above, the fuel is delivered to the fuel return downstream of the hydraulic actuator.

In a further embodiment of any of the above, a thermal barrier is arranged between the valve and the hydraulic actuator.

In a further embodiment of any of the above, the shaft comprises a first shaft portion that is attached to the valve and a second shaft portion attached to the actuator. A thermal barrier is arranged between the first and second shaft portions.

In a further embodiment of any of the above the hydraulic actuator is configured to move the valve to an infinite number of positions between the open position and the closed position.

In a further embodiment of any of the above an actuator housing defines a cavity about the shaft. A cooling port extends through the housing to permit ambient air to flow into the cavity.

BRIEF DESCRIPTION OF THE DRAWINGS

The disclosure can be further understood by reference to the following detailed description when considered in connection with the accompanying drawings.

DETAILED DESCRIPTION

Figure 1:
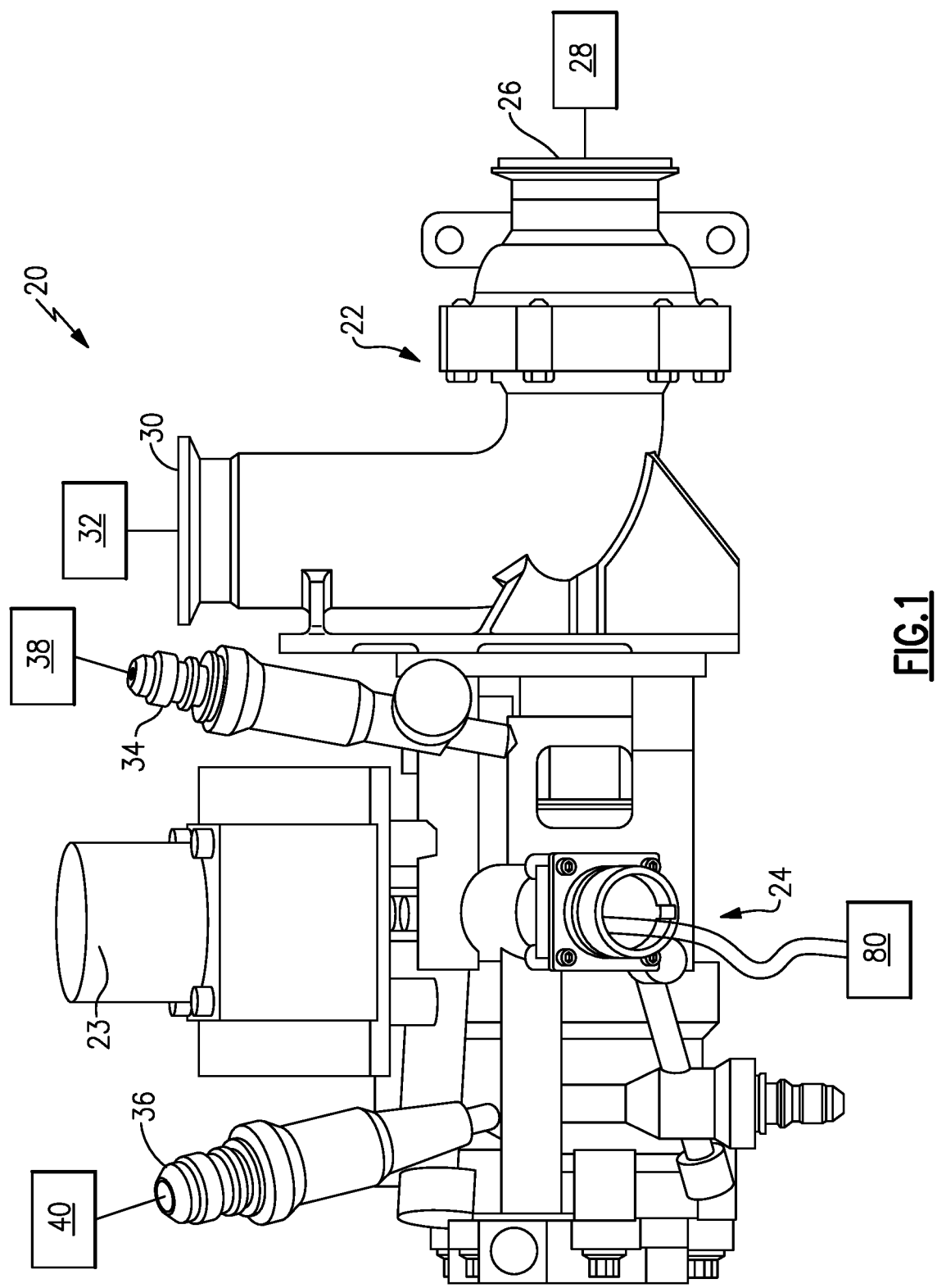
FIG. 1 is a schematic view of an example air valve assembly.

FIG. 1 shows an exemplary fueldraulic air valve assembly 20 for a gas turbine engine. The valve assembly 20 may be mounted on an engine or airframe. The engine may be a gas turbine engine, for example. Gas turbine engines are known, and may generally include a fan section, a compressor section, a combustor section and a turbine section, among other components. The gas turbine engine may be a two-spool turbofan gas turbine engine, a three-spool architecture, a direct drive turbofan, an industrial gas turbine (IGT), or any gas turbine engine as desired.

It should be appreciated that the present application is not limited to use in conjunction with a gas turbine engine. Thus, although the present application is, for convenience of explanation, depicted and described as being implemented in a gas turbine engine, the present disclosure may be utilized in numerous other machines having air management assemblies.

The example valve assembly 20 is configured to meter a high temperature fluid, such as bleed air. The valve assembly 20 generally includes an air valve 22 and an actuator 24. The high temperature fluid flows into a valve inlet 26 of the air valve 22 from a source 28, and exits a valve outlet 30 to a destination 32. In one example, the source 28 is bleed air from a compressor stage. In a further example, the source 28 is high pressure and temperature air from the sixth stage of the high pressure compressor. The air flowing into the valve 22 may have temperatures greater than about 1000° F. (537.8° C.). In some embodiments, the air flowing into the valve 22 may have temperatures greater than about 1100° F. (593.3° C.).

The actuator 24 is a fuel driven hydraulic actuator, known as a "fueldraulic" actuator. That is, the actuator 24 uses fuel as the working fluid. Fuel enters the actuator 24 through a port 34 and exits the actuator 24 through a port 36. In one example, fuel is communicated to the actuator 24 from a fuel source 38 and then provided to the fuel return 40 for use. In some examples, a position feedback, such as a linear variable displacement transformer (LVDT) 76 (shown in FIG. 3) is in communication with the electronic controller 80, to control an electrohydraulic servo valve (EHSV) 23, to control the actuator 24 and valve 22.

Figure 2A:
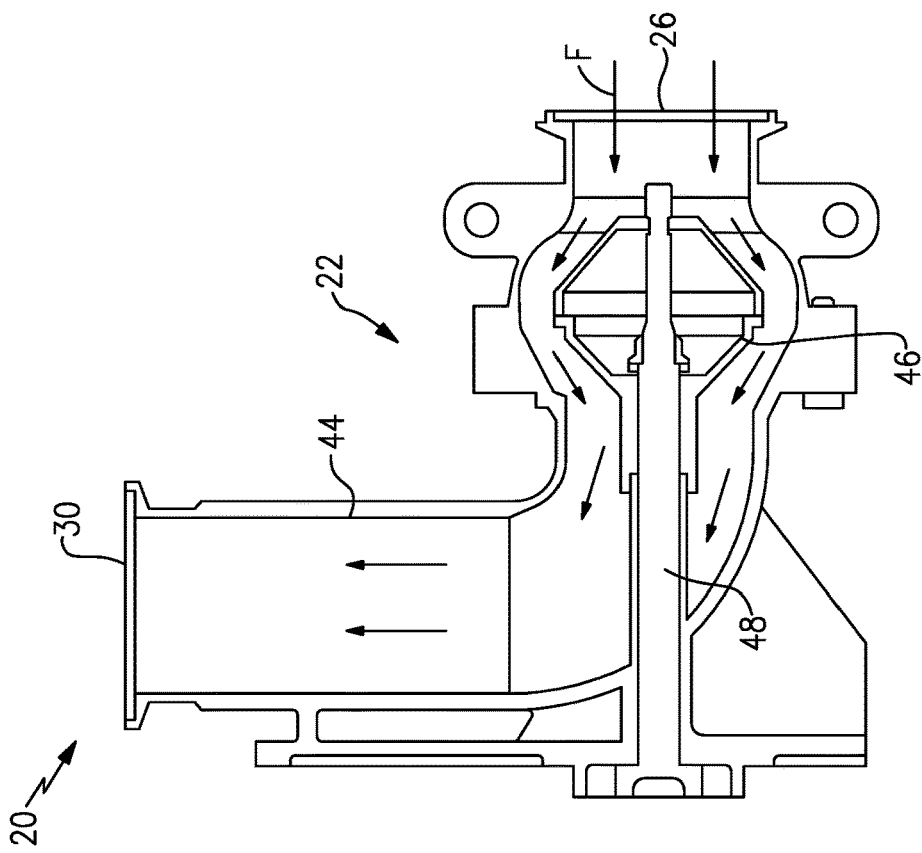
FIG. 2A is a cross-sectional view of a portion of the example air valve assembly in an open position.

FIG. 2A illustrates a cross-sectional view of the air valve 22 in an open position. The air valve 22 may be a poppet valve, for example. A flow of fluid F flows through the valve along a flow path defined by a housing 44 from the inlet 26 to the outlet 30. A poppet 46 is arranged within arranged within the housing 44. In the open position, there is space about the poppet 46 for the fluid F to flow past. The poppet 46 is arranged on a shaft 48. The shaft 48 is attached to the actuator 24 (shown in FIGS. 1 and 3).

Figure 2B:
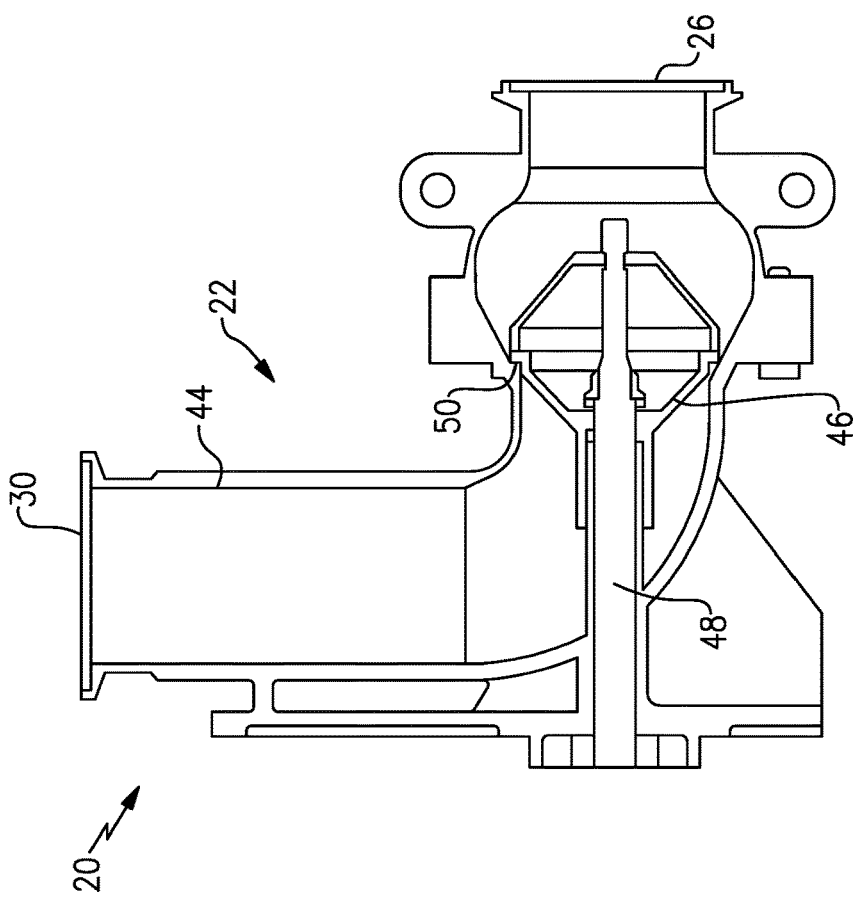
FIG. 2B is a cross-sectional view of a portion of the example air valve assembly in a closed position.

FIG. 2B illustrates a cross-sectional view of the air valve 22 in a closed position. In this position, fluid F does not flow through the valve 22. The poppet 46 abuts a seating surface 50. In one embodiment, the poppet 46 contacts the seating surface 50 circumferentially about the shaft 48 such that no fluid F flows past the poppet 46. In other embodiments, a small amount of fluid F may flow past the poppet 46 in the closed position.

The valve components, such as the housing 44, poppet 46, and shaft 48 are formed from a material that can withstand very high heats because the fluid F may have temperatures over about 1000° F. (537.8° C.). In some examples, the housing 44, poppet 46, and shaft 48 are formed a metallic material. The housing 44, poppet 46, and shaft 48 may be formed from a nickel alloy such as Inconel, for example. The housing 44, poppet 46, and shaft 48 may be the same material, or may be different materials.

In some examples, the valve 22 may be manipulated to various positions between the open and closed positions. This may permit modulation of the air flow. The valve 22 may be moved to an infinite number of positions between the open and closed positions, for example. The position of the valve 22 is controlled by the actuator 24 via the shaft 48. The actuator 24 may be controlled by an EHSV 23 (shown in FIG. 1), for example. The actuator 24 and the EHSV 23 may have an upper temperature limit that is much lower than the temperature of the fluid F. For example, the actuator 24 and EHSV 23 may have an upper temperature limit of about 300° F. (148.9° C.).

Figure 3:
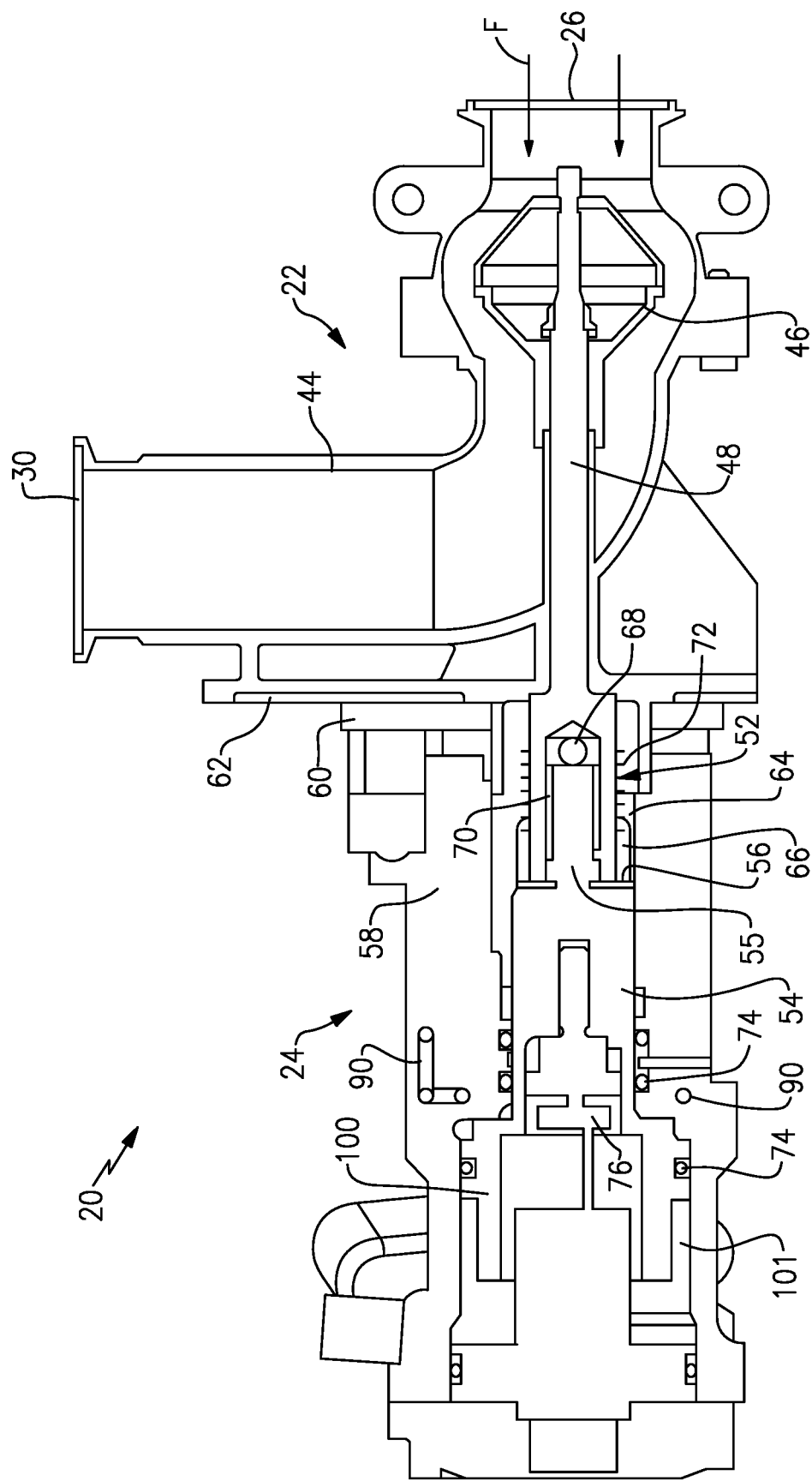
FIG. 3 is a cross-sectional view of the example air valve assembly.

FIG. 3 illustrates a cross-sectional view of the valve assembly 20. The valve housing 44 is mechanically attached to an actuator housing 58. A thermal barrier 60 may be arranged between the valve housing 44 and the actuator housing 58. The thermal barrier 60 helps to mitigate heat transfer from the valve housing 44 to the actuator housing 58. In some embodiments, a radiant barrier 62 may also be arranged between the valve housing 44 and the actuator housing 58. The radiant barrier 62 provides a shield between the housings 44, 58 to mitigate heat transfer.

The shaft 48 extends through the valve housing 44 into the actuator housing 58. The shaft 48 may have a threaded portion 52 that is secured to an end portion 55 of a piston rod 54. The piston rod 54 includes a piston 100 actuated by the fuel in an actuator chamber 101, which in turn actuates the shaft 48 and poppet 46. A thermal barrier 56 may be arranged between the shaft 48 and the piston rod 54. The thermal barrier 56 helps mitigate heat transfer from the shaft 48 to the piston rod 54, and thus the fuel.

In some examples, a cavity 64 is defined within the actuator housing 58. The cavity 64 may surround a portion of the shaft 48. In one example, the cavity 64 surrounds the threaded portion 52 where the shaft 48 is coupled to the piston rod 54. As is clear, cavity 64 is between the piston 100 and popper 46. A cooling port 66 may extend through the actuator housing 58 into the cavity 64. Ambient air may flow through the cooling port 66 into the cavity 64 to help cool the shaft 48. The ambient air may be air located within an engine nacelle compartment, for example. Generally, the ambient air surrounding the assembly 20 is cooler than the fluid F flowing through the valve 22. In some examples, another cooling port 68 is arranged within the threaded portion 52 of the shaft 48 to help cool the shaft 48. The cooling port 68 permits ambient air to flow into a cavity defined within the shaft 48.

Cooling fins 72 may be arranged on the piston rod 54 or the shaft 48. The cooling fins 72 help dissipate heat transfer between the shaft 48, and the ambient air. The cooling fins 72 may be machined onto the shaft 48, for example.

A locking insert 70 may be arranged between the shaft 48 and the actuator piston rod 54. The locking insert 70 helps resist twisting of the shafts 48, 54 relative to one another. The locking insert 70 may also provide an additional thermal barrier between the shaft 48 and piston rod 54.

Seals 74 may be arranged about the piston rod 54. The seals 74 help prevent fuel from travelling down the piston rod 54. The flowing fuel from the fuel source 38 to the fuel return 40, may be ported around the seals 74 to provide internal cooling via a port 90. The port 90 may include drilled lines, for example.

The fuel actuator 24 may be controlled actively. In some examples, an LVDT 76 provides information regarding the linear position of the actuator 24. The LVDT may communicate with the electroninc controller 80, for example.

The thermal barriers 60, 56 may be formed from materials that have a low heat transfer coefficient. For example, the barriers 60, 56 may be formed from ceramic or titanium. Other materials having a low heat transfer coefficient may be used, however. In some examples, a material having moderate compressive strength, such as titanium, may be helpful. A sandwiched material may be useful for the barriers 60, 56, in some examples. For example, a material with layers including a thermal paper may be used to help prevent heat transfer.

In further embodiments, the interfacing surfaces may have a finish to prevent heat transfer. For example, surfaces of the housings 58, 44, or thermal barriers 56, 60 may be machined to increase roughness of the mating surfaces. This is to minimize surface contact between the mating surfaces, lowering the amount of heat transfer between the mating surfaces.

The disclosed assembly permits the air valve to be coupled to a fuel actuator. The air valve receives air at a very high temperature, while the fuel actuator must remain at a relatively low temperature. The thermal barriers and cooling features help minimize heat transfer from the high temperature air to the fuel actuator. Thermal barriers may be arranged between the shafts 48, 54, and/or between the housings 44, 58 to mitigate heat transfer. The disclosed features may help minimize conductive, convective, and radiative heat transfer. The fueldraulic actuator may provide better modulation of the air valve and be more reliable than known air valve actuators.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A valve assembly for a turbine engine, comprising:
    a poppet valve arranged in an air flow path, the valve having a shaft, the valve movable between an open position and a closed position; and
    a hydraulic actuator coupled to the shaft, the hydraulic actuator configured to utilize fuel as a working fluid, the hydraulic actuator configured to move the valve between the open position and the closed position, wherein a linear variable displacement transformer is arranged on the shaft, wherein an actuator housing defines a cavity about the shaft and a cooling port extends through the housing to permit ambient air to flow into the cavity.

2. The valve assembly of claim 1, wherein the valve is formed from metallic components.

3. The valve assembly of claim 1, wherein a thermal barrier is arranged between the valve and the hydraulic actuator.

4. The valve assembly of claim 1, wherein cooling fins are arranged on the shaft.

5. The valve assembly of claim 1, wherein the shaft comprises a first shaft portion that is attached to the valve and a second shaft portion attached to the actuator, wherein a thermal barrier is arranged between the first and second shaft portions.

6. The valve assembly of claim 1, wherein a plurality of seals are arranged about a piston rod of the hydraulic actuator.

7. The valve assembly of claim 6, wherein the actuator housing includes a port configured to communicate fuel around the plurality of seals.

8. The valve assembly of claim 1, wherein the hydraulic actuator includes an actuator chamber receiving a piston connected to drive the shaft and the valve, and said cavity being between said piston and said valve.

9. The valve assembly of claim 1, wherein a cooling port extends through said shaft to communicate with said cavity.

10. A turbine engine, comprising:
    a compressor configured to deliver air to a combustor; and
    a poppet valve assembly having a valve arranged in an air flow path connected to the compressor, the valve having a shaft, the valve movable between an open position and a closed position, and a hydraulic actuator coupled to the shaft, the hydraulic actuator configured to communicate and utilize fuel as a working fluid, wherein a linear variable displacement transformer is arranged on the shaft, the hydraulic actuator configured to move the valve between the open position and the closed position, wherein an actuator housing defines a cavity about the shaft and a cooling port extends through the housing to permit ambient air to flow into the cavity.

11. The turbine engine of claim 10, wherein the air flow path receives bleed air from the compressor.

12. The turbine engine of claim 11, wherein the fuel is delivered to a fuel return downstream of the hydraulic actuator.

13. The turbine engine of claim 10, wherein a thermal barrier is arranged between the valve and the hydraulic actuator.

14. The turbine engine of claim 10, wherein the shaft comprises a first shaft portion that is attached to the valve and a second shaft portion attached to the actuator, wherein a thermal barrier is arranged between the first and second shaft portions.

15. The turbine engine of claim 10, wherein the ambient air is provided from an engine nacelle compartment.

16. The turbine engine of claim 14, wherein the hydraulic actuator includes an actuator chamber receiving a piston connected to drive the shaft and the valve, and said cavity being between said piston and said valve.

17. The turbine engine of claim 14, wherein a cooling port extends through said shaft to communicate with said cavity.

* * * * *